United States Patent [19]

Ingram

[11] Patent Number: 4,547,527

[45] Date of Patent: Oct. 15, 1985

[54] IMPREGNATION SUSPENSION SYSTEM FOR EXPANDABLE STYRENE/MALEIC ANHYDRIDE PARTICLES

[75] Inventor: Alvin R. Ingram, West Chester, Pa.

[73] Assignee: Atlantic Richfield Company, Los Angeles, Calif.

[21] Appl. No.: 679,785

[22] Filed: Dec. 10, 1984

[51] Int. Cl.⁴ .............................................. C08J 9/18
[52] U.S. Cl. ........................................ 521/60; 521/56
[58] Field of Search ................................... 521/56, 60

[56] References Cited

U.S. PATENT DOCUMENTS

| | | | |
|---|---|---|---|
| 3,039,977 | 6/1962 | Ingram | 521/98 |
| 3,819,547 | 6/1974 | Pillar et al. | 521/60 |
| 3,960,787 | 6/1976 | Isukamolo et al. | 521/60 |
| 3,975,327 | 8/1976 | Nintz et al. | 521/60 |
| 4,017,427 | 4/1977 | Granda et al. | 521/60 |
| 4,312,957 | 1/1982 | Spicuzza, Jr. | 521/60 |
| 4,430,450 | 2/1984 | Senda et al. | 521/60 |
| 4,439,547 | 3/1984 | Di Guilio | 521/60 |
| 4,442,232 | 4/1984 | Kajimura et al. | 521/60 |

*Primary Examiner*—Morton Foelak
*Attorney, Agent, or Firm*—Lewis J. Young

[57] ABSTRACT

The absorption of water by styrene/maleic anhydride copolymer particles during the impregnation of the particles in aqueous suspension is greatly reduced by the addition of salt to the impregnation system.

This process produces expandable particles of non-equimolar copolymers of styrene and maleic anhydride having considerable less heterogeneity, finer cell structure, greater expandability, less heat sensitivity, less shrinkage, and lower density potential on molding.

5 Claims, No Drawings

IMPREGNATION SUSPENSION SYSTEM FOR EXPANDABLE STYRENE/MALEIC ANHYDRIDE PARTICLES

BACKGROUND OF THE INVENTION

This invention relates to a method of impregnating styrene/maleic anhydride copolymer particles with a blowing agent in aqueous suspension.

The impregnation of polystyrene particles with blowing agent in aqueous suspension is a well known process. Certain styrene copolymers, however, are susceptible to absorbing water from the aqueous suspending medium and retaining said water to the detriment of subsequent expanding and molding properties.

Thus, U.S. Pat. No. 3,039,977 to Ingram relates that brominated polystyrene retains water. The problem was eliminated by the addition of water-soluble metal salts to the suspension medium.

Similarly, U.S. Pat. No. 4,430,450 relates that certain pelletized emulsion-prepared styrene copolymers with alpha-alkylstyrenes, acrylonitrile, acrylates and methacrylates tend to absorb up to 3% moisture from the suspension impregnation process. Again, use of a water-soluble salt reduced the water absorption by these copolymers from 3% to less than 1%.

Neither of these references suggested that water absorptions as high as 10–12% could be eliminated by the use of salts.

SUMMARY OF THE INVENTION

I have now found that the absorption of water by styrene/maleic anhydride copolymer particles during the impregnation of the particles in aqueous suspension is greatly reduced by the addition of salt to the impregnation medium. The water absorption is reduced from something greater than 10% by weight to less than 4% by weight.

DETAILED DESCRIPTION OF THE INVENTION

The process of this invention produces expandable particles of non-equimolar copolymers of styrene and maleic anhydride having considerably less heterogeneous cell structure, finer cell size, greater exandability, less molding heat sensitivity, less shrinkage of molded foams, and improved moldability of lighter weight foams.

The process comprises forming an aqueous suspension of particles of a non-equimolar copolymer of styrene and a minor amount of maleic anhydride and stabilizing the suspension by a suitable suspending agent system; adding to the suspension system a mixture of a hydrocarbon blowing agent and a water soluble metal salt; maintaining said suspension at a temperature of betweeen 80° and 150° C. until said hydrocarbon is incorporated into the copolymer particles; and separating said particles from the aqueous suspension.

The base resins useful in the invention are styrene/maleic anhydride copolymers containing 5 to 35% by weight of maleic anhydride. Such non-equimolar copolymers can be prepared by the methods disclosed in U.S. Pat. Nos. 2,769,804, 2,971,935, 2,989,517 and 3,509,110. The copolymers may also be purchased commercially as Dylark® styrene copolymers, sold by ARCO Chemical Company, a Division of Atlantic Richfield Company.

The term "particles" is meant to cover beads, pellets, coarse grindings, and any other pieces of a size sufficiently small for filling foam molds.

The particles are impregnated in an aqueous suspension. The weight ratio of particles to aqueous medium may be from 0.3:1 to 1.1:1.

The aqueous medium comprises water and an appropriate amount of a suspending agent system. Preferably, the sparingly water-soluble inorganic compounds such as calcium phosphate, calcium carbonate, magnesium pyrophosphate, magnesium oxide and the like are used. The suspending agents are used in amounts between 0.01 and 5% by weight based on the water used. It is also possible to use certain surfactants as extenders for the inorganic suspending agents. One such extender is sodium dodecylbenzene sulfonate. The extenders are useful in amounts of from 0.006 to 0.10% by weight based on water used.

The salts useful in the invention are water-soluble metal salts selected from the group consisting of sodium chloride, calcium chloride, magnesium chloride, potassium chloride, and mixtures thereof. Although only the chloride salts are listed above, it is possible to use the salt of most acids which are at least as strong as carbonic acid, such as the fluoride, bromide, iodide, sulfate, sulfite and nitrate. The salts are added in amounts from 3 to 20% by weight based on water.

The suitable blowing agents are one or more compounds selected from aliphatic hydrocarbons containing 4 to 6 carbon atoms in the molecule, including butane, pentane, cyclopentane, hexane, and cyclohexane, and the halogenated hydrocarbons containing 1 to 4 carbon atoms which boil at a temperature below the softening point of the copolymer particles. The blowing agents are normally used in concentrations of from 3 to 12% by weight based on copolymer weight.

The impregnation of the copolymer particles with the blowing agent and the inorganic salt is carried out by heating the aqueous suspension at a temperature of from 80° to 150° C. for a period of time sufficient to incorporate the blowing agent into the copolymer particles without leaving residual hard cores in said particles.

Separation of the impregnated particles from the aqueous suspension medium may be accomplished by known methods. One such method involves acidification of the suspension to about pH of 1.0, filtration of the polymer particles, washing with water and then tray-drying at room temperature.

The presence of maleic anhydride in the instant copolymer particles causes the particles to absorb an inordinate amount of water (10–12 weight %) making subsequent molding of the expanded particles difficult if not impossible. The use of the inorganic metal salt reduces the amount of absorbed water to an acceptable amount which allows the particle to be molded with less sensitivity to heat and allows the molded article to undergo less undesirable shrinkage.

The invention is further illustrated by the following examples wherein parts and percentages are by weight unless otherwise indicated.

EXAMPLE I

To each of a series of 12 oz. Crown cap bottles was charged 150 g. of water, 1.33 g. of tricalcium phosphate, 0.04 g. of sodium dodecylbenzene sulfonate, 0.1 g. of polyoxyethylene (20) sorbitan monolaurate, 100 g. of styrene-maleic anhydride copolymer pellets containing 17% by weight of anhydride, 11.5 g. of n-pentane and the amounts of sodium chloride shown in Table I.

The bottles were sealed and then rotated end-over-end for 3 hours at 90° C. and 8 hours at 110° C. in an oil bath. The bottles were then cooled to room temperature, opened, acidified with hydrochloric acid, the beads separated from the aqueous medium, washed with water, and air dried. The water content of the particles was determined with a DuPont Moisture Analyzer No. 902 at 65° C. and reported in Table I.

Samples were pre-expanded in the Kohler General Drispander using 50 psi steam and the bulk densities recorded. The samples were molded into 6"×14" plaques in a Kohler General 601 press. The percent shrinkage of the molded plaques was measured after 2 hours at 220° F. on 1 day old moldings.

TABLE I

| % Salt In Water | % Water In Product | Density, pcf. | % Shrinkage |
|---|---|---|---|
| 0 | 11.4 | 16.5 | NA[a] |
| 1.64 | 3.8 | 6.6 | 1.5 |
| 2.7 | 3.0 | 6.5 | 1.4 |
| 14.2 | 1.2 | 5.0 | 0.25 |

[a]Contained too much water to be molded.

The amount of salt necessary to produce moldings with acceptable shrinkage varied directly with the percent maleic anhydride in the base copolymer. The necessary amount of salt was also found to vary with the particular salt used. Amounts can be determined with minimal experimental trials.

EXAMPLE II

To each of a series of 12 oz. Crown cap bottles was charged 129 g. of water, 0.02 g. of sodium dodecylbenzene sulfonate, 0.05 g. of polyoxyethylene (20) sorbitan monolaurate, 100 g. of styrene-maleic anhydride copolymer pellets containing 17% by weight of anhydride, 11.1 g. of n-pentane, 1.3 g. of magnesium pyrophosphate made by adding tetrasodium pyrophosphate and excess magnesium chloride, and the amount of sodium chloride shown in Table II. The inherent salt formed during the formation of the magnesium pyrophosphate amounted to 1.7% magnesium chloride and 0.54% sodium chloride.

The bottles were sealed and then rotated end-over-end for 3 hours at 90° C. and 8 hours at 110° C. in an oil bath. The bottles were then cooled to room temperature, opened, acidified with hydrochloric acid, the beads separated from the aqueous medium, washed with water and air dried. The water content of the particles was determined with a DuPont Moisture Analyzer No. 902 at 65° C. and reported in Table II.

Samples were pre-expanded and molded as in Example I.

TABLE II

| % Salt in H$_2$O Added (Total) | % Water in Product | Density, pcf. | % Shrinkage 2 hours | % Shrinkage 1000 hours |
|---|---|---|---|---|
| 0(2.24)(a) | 2.43 | 4.8 | 1.43 | 2.8 |
| 0.75(2.99) | 2.71 | 5.4 | 1.42 | — |
| 1.125(3.365) | 2.09 | 4.9 | 1.50 | — |
| 1.80(4.04) | 2.85 | — | 1.30 | — |
| 1.84(4.11) | 2.85 | 5.9 | 0.93 | — |
| 2.25(4.49) | 1.59 | 5.1 | 0.92 | — |
| 3.75(5.99) | 1.95 | 4.8 | 0.22 | 1.6 |
| 7.5(9.74) | 1.41 | 4.5 | 0.16 | 1.0 |
| 9.0(11.24) | 1.30 | 4.1 | 0.29 | 1.6 |
| 12.0(14.24) | 1.32 | 3.8 | 0.27 | 1.6 |

(a)Made up of 1.7% MgCl$_2$ and 0.54% NaCl from the reaction of a slight excess of MgCl$_2$ with Na$_4$P$_2$O$_7$.

From the table, it can be seen that a general trend towards decreasing density and 2-hour oven shrinkage with increasing salt concentration exists. Further, it appears from the data that shrinkage was minimized at a salt concentration of approximately 6% in the water phase.

Similar effects can be noted by substituting calcium chloride, or potassium chloride for the above salts.

What is claimed is:

1. A process for preparing expandable particles from non-equimolar copolymers of styrene and a minor amount of maleic anhydride comprising:
   a. forming an aqueous suspension of particles of a non-equimolar copolymer of styrene and a minor amount of maleic anhydride, said suspension being stabilized by a suitable suspending agent system;
   b. adding to the suspension a mixture of 3 to 12% by weight based on copolymer of a hydrocarbon blowing agent and 3–20% by weight based on water of a water-soluble metal salt;
   c. maintaining said suspension at a temperature of between 80° C. and 150° C. until said hydrocarbon is incorporated into the copolymer particle; and
   d. separating said particles from said aqueous suspension.

2. The process of claim 1 wherein said minor amount of maleic anhydride may be between 5 and 35 percent by weight based on copolymer composition.

3. The process of claim 1 wherein said suspending agent system is magnesium pyrophosphate.

4. The process of claim 1 wherein said suspending agent system is a mixture of tricalcium phosphate suspending agent and an anionic surfactant.

5. The process of claim 1 wherein said water-soluble metal salt is selected from one or more salts selected from the group consisting of sodium chloride, calcium chloride, magnesium chloride, and potassium chloride.

* * * * *